United States Patent
Yoshida et al.

(10) Patent No.: US 11,258,588 B2
(45) Date of Patent: Feb. 22, 2022

(54) KEY EXCHANGE METHOD AND KEY EXCHANGE SYSTEM

(71) Applicant: NIPPON TELEGRAPH AND TELEPHONE CORPORATION, Chiyoda-ku (JP)

(72) Inventors: Reo Yoshida, Musashino (JP); Tetsutaro Kobayashi, Musashino (JP); Yuto Kawahara, Musashino (JP); Hitoshi Fuji, Musashino (JP); Kazuki Yoneyama, Hitachi (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 418 days.

(21) Appl. No.: 16/321,657

(22) PCT Filed: Aug. 30, 2017

(86) PCT No.: PCT/JP2017/031188
§ 371 (c)(1),
(2) Date: Jan. 29, 2019

(87) PCT Pub. No.: WO2018/043573
PCT Pub. Date: Mar. 8, 2018

(65) Prior Publication Data
US 2020/0252208 A1  Aug. 6, 2020

(30) Foreign Application Priority Data
Sep. 1, 2016  (JP) .............................. JP2016-170900

(51) Int. Cl.
*H04L 9/08* (2006.01)
*H04L 9/06* (2006.01)
*H04L 9/32* (2006.01)

(52) U.S. Cl.
CPC .......... *H04L 9/0819* (2013.01); *H04L 9/0656* (2013.01); *H04L 9/0847* (2013.01); *H04L 9/0861* (2013.01); *H04L 9/3242* (2013.01)

(58) Field of Classification Search
CPC ... H04L 9/0656; H04L 9/0819; H04L 9/0833; H04L 9/0847; H04L 9/0861; H04L 9/3242; H04L 9/08
See application file for complete search history.

(56) References Cited

U.S. PATENT DOCUMENTS 8,584,216 B1 * 11/2013 Allen .................... H04L 9/0836
726/6
2004/0179684 A1  9/2004 Appenzeller et al.
(Continued)

FOREIGN PATENT DOCUMENTS

CN  101431414 A  5/2009
JP  2006-528874 A  12/2006
WO  WO 2009/043266 A1  4/2009

OTHER PUBLICATIONS

International Search Report dated Oct. 3, 2017, in PCT/JP2017/031188, filed Aug. 30, 2017.
(Continued)

*Primary Examiner* — Olugbenga O Idowu
(74) *Attorney, Agent, or Firm* — Oblon, McClelland, Maier & Neustadt, L.L.P.

(57) ABSTRACT

Plurality of users share a common key while permitting change of members sharing the common key and computational complexity required for key exchange is reduced. $R_i$ and $c_i$ are computed based on a twisted pseudo-random function in a first key generation step. sid is generated based on a target-collision resistant hash function and (sid, $R_\alpha$, $R_\beta$) is transmitted to communication devices $U_i$ in a session ID generation step. $T_1$ and T' are computed based on a pseudo-random function in a representative second key generation
(Continued)

step. $T_j$ is computed based on the pseudo-random function in a general second key generation step. k' is computed based on the twisted pseudo-random function and $T'_j$ is computed with respect to each j in a third key generation step. $K_1^1$ and $k_1$ are computed in a first session key generation step. A common key $K_2$ is generated based on the pseudo-random function in a second session key generation step.

4 Claims, 5 Drawing Sheets

(56) References Cited

U.S. PATENT DOCUMENTS

| | | | |
|---|---|---|---|
| 2008/0165956 A1* | 7/2008 | Zhu | H04L 9/0869 380/44 |
| 2011/0305333 A1 | 12/2011 | Jacobson et al. | |
| 2013/0182848 A1 | 7/2013 | Sundaram et al. | |
| 2015/0195261 A1 | 7/2015 | Gehrmann et al. | |

OTHER PUBLICATIONS

Notice of Reasons for Refusal dated Oct. 9, 2018, in Japanese Patent Application No. 2016-170900, filed Sep. 1, 2016 (with English translation).

Kobayashi, T. et al., "Scalable and Dynamic Multi-Cast Key Distribution", 2016 Symposium on Cryptography and Information Security, Jan. 19-22, 2016, pp. 1-7.

Yoneyama, K. et al., "Multi-Cast Key Distribution: Scalable, Dynamic and Provably Secure Construction", Cryptology ePrint Archive, Report 2016/833, Sep. 1, 2016, pp. 1-28.

Mittra, S. "Iolus: A Framework for Scalable Secure Multicasting", SIGCOMM '97, 1997, pp. 1-12.

Ballardie, A. "Scalable Multicast Key Distribution", https://tools.ietf.org/html/rfc1949, retrieved on Jul. 12, 2016, pp. 1-18.

Goldreich, O., "Modern Cryptography, Probabilistic Proofs and Psuedo-randomness", 2001, 3 pages (Japanese and English submitted).

Buchmann, J. "Introduction to Cryptography The original $3^{rd}$ edition", 2007, 10 pages (Japanese and English submitted).

Boneh, D. et al., "Functional Encryption: Definitions and Challenges", TCC, Lecture Notes in Computer Science, vol. 6597, 2011, pp. 1-23 (with bibliographic page).

Martin, L. "Introduction to Identity-Based Encryption", Jan. 2008, 16 pages.

Yoneyama, K., "One-Round Authenticated Key Exchange with Strong Forward Secrecy in the Standard Model against Constrained Adversary", IEICE Transactions, 2013, vol. E96-A, No. 6, pp. 1124-1138.

Extended European Search Report dated Jan. 16, 2020 in European Patent Application No. 17846577.9, citing documents AA, AB, AC, AO and AP therein, 8pages.

* cited by examiner

KEY EXCHANGE METHOD AND KEY EXCHANGE SYSTEM

TECHNICAL FIELD

The present invention relates to an application of an information security technology, and especially relates to a key exchange technology by which a plurality of users forming a group share a common key.

BACKGROUND ART

The key exchange technology by which a plurality of users forming a group share a common key has been conventionally proposed (see Non-patent Literatures 1 and 2, for example). An architecture of an information system for realizing such key exchange technology is described in Non-patent Literature 1. An algorithm for such key exchange technology is described in Non-patent Literature 2.

PRIOR ART LITERATURE

Non-Patent Literature

Non-patent Literature 1: Suvo Mittra, "Iolus: a framework for scalable secure multicasting", SIGCOMM '97, pp. 277-288

Non-patent Literature 2: "Scalable Multicast Key Distribution", [online], [retrieved on Jul. 12, 2016], internet <URL:https://tools.ietf.org/html/rfc1949>

SUMMARY OF THE INVENTION

Problems to be Solved by the Invention

In the related-art technologies described in Non-patent Literatures 1 and 2, it is impossible for a plurality of users to share a common key while permitting dynamic member change such as to newly share the common key with users other than those already sharing the common key. Further, since the whole computational complexity required for key exchange is O(log n) when the number of users is denoted as n, there is a problem that the computational complexity for the key exchange is increased along with increase of the number of users.

In view of this problem, an object of the present invention is to provide a key exchange technology which enables a plurality of users to share a common key while permitting change of members who share the common key and enables reduction in computational complexity required for key exchange.

Means to Solve the Problems

According to an aspect of the present invention, n denotes an integer which is 2 or larger, i denotes each integer from 1 to n, j denotes each integer from 2 to n, S denotes a key distribution device, $U_i$ denotes n pieces of communication devices, $U_1$ denotes one piece of representative communication device which is selected from the communication devices $U_i$, $U_j$ denotes n−1 pieces of general communication devices obtained by excluding the representative communication device $U_1$ from the communication devices $U_i$, ∥ denotes a concatenation operator, α and β are defined by following formulas, $$\alpha = \begin{cases} i-1 & \text{if } i-1 \geq 1 \\ i-1+n & \text{if } i-1 < 1 \end{cases},$$

$$\beta = \begin{cases} i+1 & \text{if } i+1 \leq n \\ i+1-n & \text{if } i+1 > n \end{cases}$$

secret strings $st_s$ and $st'_s$ are stored in a storage of the key distribution device S, and secret strings $st_i$ and $st'_i$ are stored in a storage of the communication devices $U_i$. The aspect includes: a first key generation step in which the communication devices $U_i$ generate $r_i$, $k_i$, and $s_i$ by using the secret strings $st_i$ and $st'_i$ based on a twisted pseudo-random function, compute $R_i=g^{r_i}$ and $c_i=g^{k_i}h^{s_i}$, and transmit $(R_i, c_i)$ to the key distribution device S; a session ID generation step in which the key distribution device S generates sid by using $c_1, \ldots, c_n$ based on a target-collision resistant hash function and transmits, to the communication devices $U_i$, (sid, $R_\alpha$, $R_\beta$) with respect to each i; a representative second key generation step in which the representative communication device $U_1$ generates $K_1^1$ by using (sid, $R_n^{r_1}$) based on a pseudo-random function, generates $K_1^r$ by using (sid, $R_2^{r_1}$) based on the pseudo-random function, computes $T_1$ by an exclusive OR of $K_1^1$ and $K_1^r$, computes T' by an exclusive OR of $K_1^1$ and $k_1\|s_1$, and transmits $(T_1, T')$ to the key distribution device S; a general second key generation step in which the general communication devices $U_j$ generate $K_j^1$ by using (sid, $R_\alpha^{r_j}$) based on the pseudo-random function, generate $K_j^r$ by using (sid, $R_\beta^{r_j}$) based on the pseudo-random function, compute $T_j$ by an exclusive OR of $K_j^1$ and $K_j^r$, and transmit $(k_j, s_j, T_j)$ to the key distribution device S; a third key generation step in which the key distribution device S generates $k_s$ by using the secret strings $st_s$ and $st'_s$ based on the twisted pseudo-random function, computes k' by an exclusive OR of $k_2, \ldots, k_n, k_s$, computes $T'_j$ by an exclusive OR of $T_1, \ldots, T_{j-1}$ with respect to each j, transmits k' to the representative communication device $U_1$, and transmits (k', $T'_j$, T') to the general communication devices $U_j$; a first session key generation step in which the general communication devices $U_j$ compute $K_1^1$ by an exclusive OR of $T'_j$ and $K_j^1$ and compute $k_1\|s_1$ by an exclusive OR of T' and $K_1^1$; and a second session key generation step in which the communication devices $U_i$ generate a common key $K_2$ by using sid and an exclusive OR of k' and $k_1$ based on the pseudo-random function.

Another aspect of the present invention is a key exchange method for a case where communication devices $U_{n+1}, \ldots, U_{n+k}$ newly join a session established by communication devices $U_1, \ldots, U_n$, when n denotes an integer which is 2 or larger, k denotes an integer which is 1 or larger, ∥ denotes a concatenation operator, S denotes a key distribution device, and $U_i$ (i=1, . . . , n+k) denotes n+k pieces of communication devices, in which $U_1$ denotes one piece of representative communication device which is selected from the communication devices $U_1, U_n, U_{n+1}, \ldots, U_{n+k}$, secret strings $st_s$ and $st'_s$ are stored in a storage of the key distribution device S, secret strings $st_i$ and $st'_i$ are stored in a storage of the communication devices $U_i$ (i=1, . . . , n+k), and secret information r, which is generated in the session established by communication devices $U_1, \ldots, U_n$, is stored in the storage of the communication devices $U_1, \ldots, U_n$. The key exchange method includes: a first key generation step in which the communication devices $U_i$ (i=1, n, . . . , n+k) generate $r_i$, $k_i$, and $s_i$ by using the secret strings $st_i$ and $st'_i$ based on a twisted pseudo-random function, compute $R_i=g^{r_i}$ and $c_i=g^{k_i}h^{s_i}$, and transmit $(R_i, c_i)$ to the key distribution device S, and the communication devices $U_i$ (i=2, ..., n−1) generate $k_i$ and $s_i$ by using the secret strings $st_i$ and $st'_i$ based on the twisted pseudo-random function, compute $c_i = g^{k_i} h^{s_i}$, and transmit $c_i$ to the key distribution device S; a session ID generation step in which the key distribution device S generates sid by using $c_1, \ldots, c_{n+k}$ based on a target-collision resistant hash function and transmits, to the communication devices $U_i$, (sid, $R_{i−1}$) with respect to i=1, 2, sid with respect to i=3, ..., n−2, (sid, $R_{i+1}$) with respect to i=n−1, n, and (sid, $R_{i−1}, R_{i+1}$) with respect to i=n+1, ..., n+k (here, $R_0 = R_{n+K}$ and $R_{n+k+1} = R_1$); a second key generation step in which the representative communication device $U_1$ generates $K_1^1$ by using (sid, $R_{n+k}^{r_{-1}}$) based on a pseudo-random function, generates $K_1^r$ by using (sid, $g^{r_{-1}r}$) based on the pseudo-random function, computes $T_1$ by an exclusive OR of $K_1^1$ and $K_1^r$, computes T' by an exclusive OR of $K_1^1$ and $k_1 \| s_1$, and transmits $(T_1, T')$ to the key distribution device S, the communication device $U_2$ generates $K_2^1$ by using (sid, $R_1^r$) based on the pseudo-random function, generates $K_2^r$ by using (sid, $g^r$) based on the pseudo-random function, computes $T_2$ by an exclusive OR of $K_2^1$ and $K_2^r$, and transmits $(k_2, s_2, T_2)$ to the key distribution device S, the communication devices $U_i$ (i=3, ..., n−2) transmit $(k_i, s_i)$ to the key distribution device S, the communication device $U_{n−1}$ generates $K_{n−1}^1$ by using (sid, $g^r$) based on the pseudo-random function, generates $K_{n−1}^r$ by using (sid, $R_n^r$) based on the pseudo-random function, computes $T_{n−1}$ by an exclusive OR of $K_{n−1}^1$ and $K_{n−1}^r$, and transmits $(k_{n−1}, s_{n−1}, T_{n−1})$ to the key distribution device S, the communication device $U_n$ generates $K_n^1$ by using (sid, $R_n^r$) based on the pseudo-random function, generates $K_n^r$ by using (sid, $R_{n+1}^{r_{-n}}$) based on the pseudo-random function, computes $T_n$ by an exclusive OR of $K_n^1$ and $K_n^r$, and transmits $(k_n, s_n, T_n)$ to the key distribution device S, and the communication devices $U_i$ (i=n+1, ..., n+k) generate $K_i^1$ by using (sid, $R_{i−1}^{r_{-i}}$) based on the pseudo-random function, generate $K_i^r$ by using (sid, $R_{i+1}^{r_{-i}}$) based on the pseudo-random function, compute $T_i$ by an exclusive OR of $K_i^1$ and $K_i^r$, and transmit $(k_i, s_i, T_i)$ to the key distribution device S; a third key generation step in which the key distribution device S generates $k_s$, by using the secret strings $st_s$ and $st'_s$ based on the twisted pseudo-random function, computes k' by an exclusive OR of $k_2, \ldots, k_{n+k}, k_s$, computes $T'_i$ by an exclusive OR of $T_1, \ldots, T_{i−1}$ with respect to i=2, ..., n+k (here, $T_i$ is nil with respect to i=3, ..., n−1), transmits k' to the representative communication device $U_1$, and transmits (k', $T'_i$, T') to the communication devices $U_i$ (i=2, ..., n+k); a first session key generation step in which the communication devices $U_i$ (i=2, n, ..., n+k) compute $K_i^1$ by an exclusive OR of $T'_i$ and $K_i^1$ and compute $k_1 \| s_1$ by an exclusive OR of T' and $K_1^1$, and the communication devices $U_i$ (i=3, ..., n−1) compute $K_1^1$ by an exclusive OR of $T'_i$ and $g^r$ and compute $k_1 \| s_1$ by the exclusive OR of T' and $K_1^1$; and a second session key generation step in which the communication devices $U_i$ (i=1, ..., n+k) generate a common key $K_2$ by using sid and an exclusive OR of k' and $k_1$ based on the pseudo-random function.

Effects of the Invention

According to the present invention, a plurality of users can share a common key while permitting change of members who share the common key. Computational complexity required for key exchange is the constant number of times which is the number of users, that is, O(1), thus being reduced compared to the related art.

DETAILED DESCRIPTION OF THE EMBODIMENT

Figure 1:
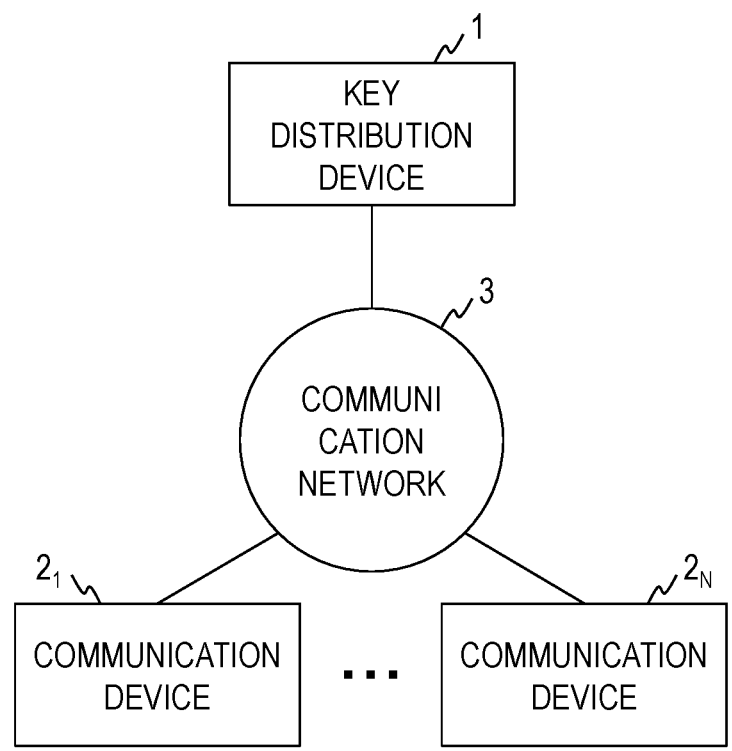
FIG. 1 illustrates the functional configuration of a key exchange system.

Prior to the description of an embodiment, the notation or the like in this specification will be described.

<Notation>

An underscore (_) denotes a subscript. For example, $x^{y\_z}$ represents that $y_z$ is a superscript with respect to x and $x_{y\_z}$ represents that $y_z$ is a subscript with respect to x.

To select an element m at random from Set which is a certain set is expressed as $m \in_R Set$.

To output y based on ALG, which is a certain algorithm, with respect to an input x and a random number r is expressed as $y \leftarrow ALG(x;r)$. Here, in the case where ALG is a deterministic algorithm, the random number r is nil.

|·| denotes the bit length of a value ·.

<Definition>

κ denotes a security parameter.

$F = \{F_\kappa : Dom_\kappa \times FS_\kappa \rightarrow Rng_\kappa\}_\kappa$ is a family of functions including a definition range $\{Dom_\kappa\}_\kappa$, a key space $\{FS_\kappa\}_\kappa$, and a value range $\{Rng_\kappa\}_\kappa$. In this case, if a function $F_\kappa$ and a true random function $RF_\kappa : Dom_\kappa \rightarrow Rng_\kappa$ cannot be distinguished with respect to a person D to be identified at arbitrary polynomial time, $F = \{F_\kappa\}_\kappa$ is called a family of pseudo-random functions. A specific example of the pseudo-random function is described in Reference Literature 1 below, for example.

Reference Literature 1: O. Goldreich, "Modern Cryptography, Probabilistic Proofs and Pseudo-randomness", Springer-Verlag Tokyo, 2001

$H = \{H_\kappa : Dom_\kappa \rightarrow Rng_\kappa\}_\kappa$ is a family of hash functions including the definition range $\{Dom_\kappa\}_\kappa$ and the value range $\{Rng_\kappa\}_\kappa$. In this case, if x' ($\neq$x) which satisfies $H_\kappa(x) = H_\kappa(x')$ when $X \in_R Dom_\kappa$ is provided cannot be found with respect to an attacker A at arbitrary polynomial time, $H = \{H_\kappa\}_\kappa$ is called a family of target-collision resistant hash functions. A specific example of the target-collision resistant hash function is described in Reference Literature 2 below, for example.

Reference Literature 2: J. A. Buchmann, "Introduction to Cryptography—Edition 3", Maruzen Publishing Co., Ltd., 2007

Message authentication code algorithms are defined as (MGen, Tag, Ver). In a MAC key generation algorithm MGen, the security parameter κ is an input and a MAC key mk is an output. In the tag generation algorithm Tag, the MAC key mk and the plaintext m are inputs and the authentication tag σ is an output. In a verification algorithm Ver, the MAC key mk, the plaintext m, and the authentication tag σ are inputs, and 1 is outputted when the authentication tag σ is correct, while 0 is outputted when the authentication tag σ is incorrect. A specific example of the message authentication code algorithm is described in Reference Literature 2 mentioned above, for example.

Functional encryption algorithms are defined as (Setup, Der, FEnc, FDec). In a setup algorithm Setup, the security parameter κ is an input and a master secret key msk and a public parameter Params are outputs. In a key derivation algorithm Der, the public parameter Params, the master secret key msk, and attribution A are inputs and a user secret key usk is an output. In an encryption algorithm FEnc, the public parameter Params, an access structure P, and the plaintext m are inputs and the cipher text CT is an output. In a decryption algorithm FDec, the user secret key usk and the cipher text CT are inputs and the plaintext m is outputted if the attribution A satisfies the access structure P. A specific example of the functional encryption algorithm is described in Reference Literature 3 below, for example.

Reference Literature 3: D. Boneh, A. Sahai, and B. Waters, "Functional encryption: definitions and challenges", TCC, Lecture Notes in Computer Science, vol. 6597, pp. 253-273, 2011.

ID-base encryption algorithms are defined as (IBE-Setup, IBE-Der, IBE-Enc, IBE-Dec). In a setup algorithm IBE-Setup, the security parameter κ is an input and a master secret key msk and a public parameter Params are outputs. In a key derivation algorithm IBE-Der, the public parameter Params, the master secret key msk, and ID∈{0, 1}* are inputs and a user secret key usk is an output. In an encryption algorithm IBE-Enc, the public parameter Params, ID∈{0, 1}*, and the plaintext m are inputs and the cipher text CT is an output. In a decryption algorithm IBE-Dec, the public parameter Params, the user secret key usk, and the cipher text CT are inputs and the plaintext m is an output. A specific example of the ID-base encryption algorithm is described in Chapter 8 "Boneh-Franklin IBE" and Chapter 9 "Boneh-Boyen IBE" in Reference Literature 4 below, for example.

Reference Literature 4: Luther Martin, "Introduction to Identity-Based Encryption", 1st Edition, Artech House, January 2008.

A function tPRF: $\{0, 1\}^\kappa \times FS_\kappa \times FS_\kappa \times \{0, 1\}^\kappa \rightarrow Rng_\kappa$ is called a twisted pseudo-random function, and $$tPRF(a,a',b,b'):=F_\kappa(a,b) \oplus F_\kappa(b',a')$$

is defined by using the pseudo-random function $F_\kappa$. Here, a, b'∈$\{0, 1\}^\kappa$ and a', b∈$FS_\kappa$. A specific example of the twisted pseudo-random function is described in Reference Literature 5 below, for example.

Reference Literature 5: Kazuki Yoneyama, "One-Round Authenticated Key Exchange with Strong Forward Secrecy in the Standard Model against Constrained Adversary", IEICE Transactions, vol. E96-A, no. 6, pp. 1124-1138, 2013.

An embodiment of the present invention will be detailed below. Components having identical functions in the drawings will be denoted by identical reference characters and duplicate description thereof will be omitted.

<System Structure>

As illustrated in FIG. 1, the key exchange system according to the embodiment includes a key distribution device 1 and N (≥2) pieces of communication devices $2_1, \ldots, 2_N$. In this embodiment, the key distribution device 1 and the communication devices $2_1, \ldots, 2_N$ are respectively connected to a communication network 3. The communication network 3 is a communication network adopting the circuit switching system or the packet switching system which is configured so that the key distribution device 1 can communicate with each of the communication devices $2_1, \ldots, 2_N$. In this embodiment, the communication devices $2_1, \ldots, 2_N$ do not have to be able to communicate with each other. The communication network 3 does not have to be a communication path in which safety is ensured but an internet or the like, for example, can be employed as the communication network 3.

Figures 2A, 2B:
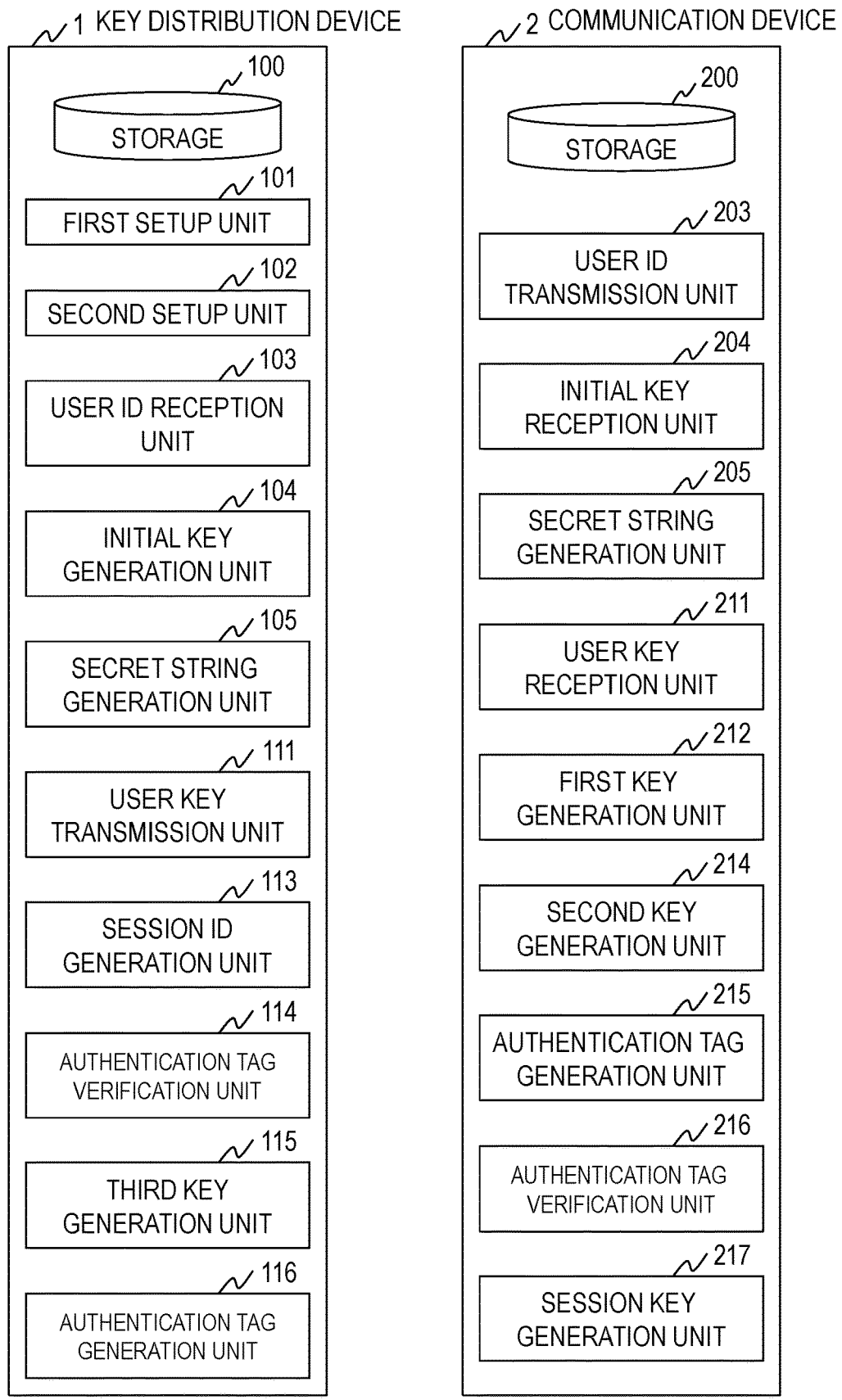
FIG. 2A illustrates the functional configuration of a key distribution device.
FIG. 2B illustrates the functional configuration of a communication device.

The key distribution device 1 includes a storage 100, a first setup unit 101, a second setup unit 102, a user ID reception unit 103, an initial key generation unit 104, a secret string generation unit 105, a user key transmission unit 111, a session ID generation unit 113, an authentication tag verification unit 114, a third key generation unit 115, and an authentication tag generation unit 116, as illustrated in FIG. 2A. The communication device 2 includes a storage 200, a user ID transmission unit 203, an initial key reception unit 204, a secret string generation unit 205, a user key reception unit 211, a first key generation unit 212, a second key generation unit 214, an authentication tag generation unit 215, an authentication tag verification unit 216, and a session key generation unit 217, as illustrated in FIG. 2B. The key distribution device 1 and the communication devices $2_1, \ldots, 2_N$ perform processing of each step illustrated in FIGS. 3 to 5, realizing the key exchange method according to the embodiment.

The key distribution device 1 and the communication devices $2_1, \ldots, 2_N$ are special devices which are configured such that a special program is read into well-known or dedicated computers including a central processing unit (CPU), a main storage device (random access memory: RAM), and the like. Each device executes processing under the control of the central processing unit, for example. Data inputted into each device and data obtained through each processing are stored in the main storage device, for example, and the data stored in the main storage device is read onto the central processing unit as appropriate to be used for other processing. At least part of processing units included in each device may be composed of hardware such as an integrated circuit.

The storage 100 included in the key distribution device 1 and the storage 200 included in the communication devices $2_1, \ldots, 2_N$ may be composed of a main storage device such as a random access memory (RAM), an auxiliary storage device composed of a hard disk, an optical disk, or a semiconductor memory element such as a flash memory, or middleware such as a relational database and a key value store. Since each storage stores secret information, it is preferable that each storage is a storage device having tamper resistance (a SIM card, for example).

<System Setup>

Figure 3:
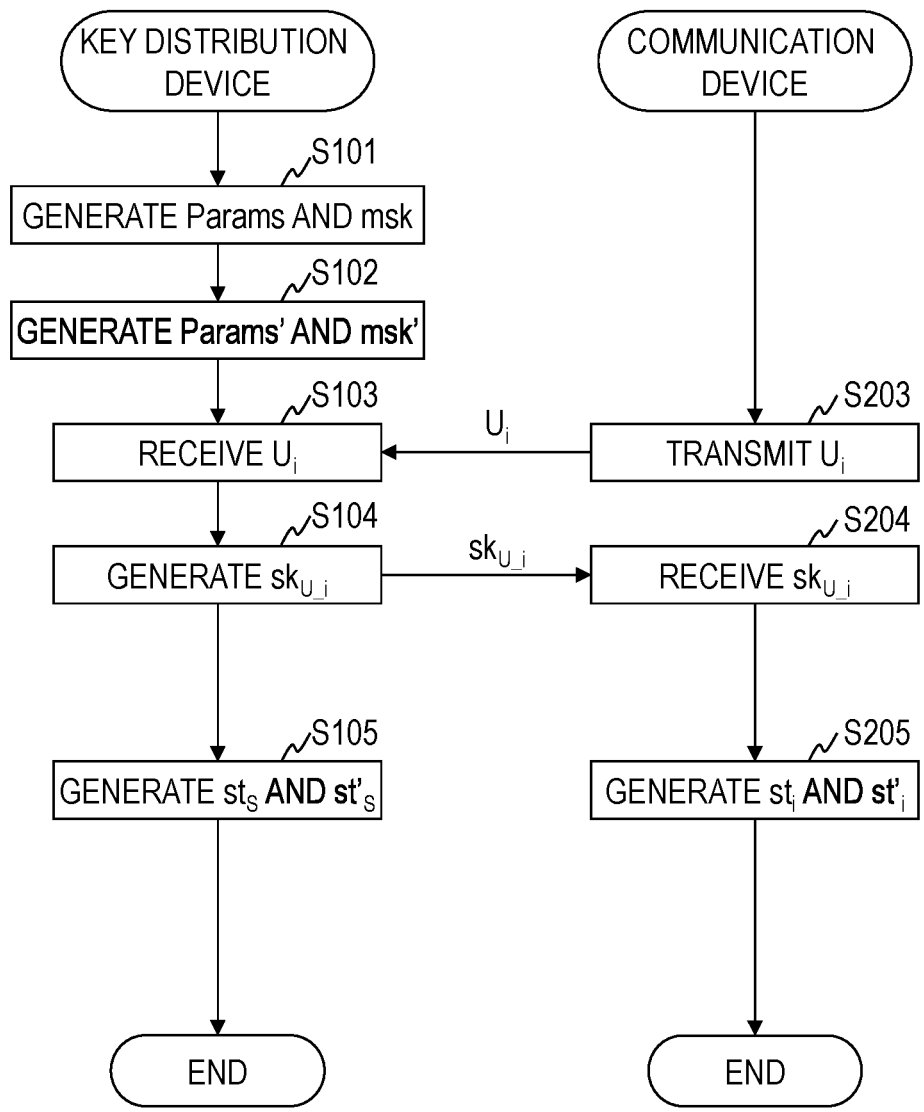
FIG. 3 illustrates a processing flow (system setup) in a key exchange method.

A processing procedure for system setup in the key exchange method according to the embodiment will be described with reference to FIG. 3.

In the following description, symbols will be defined as the following. S denotes the key distribution device 1 and $U_i$ (i∈{1, ..., N}) denote N pieces of communication devices $2_1, \ldots, 2_N$. G denotes a multiplicative cyclic group of a prime number order p of κ bits. Each of g and h denotes a generator of the group G. H: $\{0, 1\}^* \rightarrow \{0, 1\}^\kappa$ denotes a target-collision resistant hash function. tPRF: $\{0, 1\}^\kappa \times FS_\kappa \times FS_\kappa \times \{0, 1\}^\kappa \rightarrow Z_p$ and tPRF': $\{0, 1\}^\kappa \times FS_\kappa \times FS_\kappa \times \{0, 1\}^\kappa \rightarrow FS_\kappa$ denote twisted pseudo-random functions. F: $\{0, 1\}^\kappa \times G \rightarrow Z_p^2$, F': $\{0, 1\}^\kappa \times Z_p \rightarrow FS_\kappa$, F'': $\{0, 1\}^\kappa \times FS_\kappa \rightarrow \{0, 1\}^\kappa$, and F''': $\{0, 1\}^\kappa \times FS_\kappa \rightarrow Z_p$ denote pseudo-random functions.

Here, when S and $U_i$ are inputs of each algorithm, S and $U_i$ denote identifiers for uniquely specifying respective devices.

In step S101, the first setup unit 101 of the key distribution device S generates the public parameter Params and the master secret key msk based on the setup algorithm Setup for functional encryption. The first setup unit 101 transmits the public parameter Params to each of the communication devices $U_1, \ldots, U_N$. The public parameter Params and the master secret key msk are stored in the storage 100. Further, the communication devices $U_i$ store the public parameter Params received from the key distribution device S in the storage 200.

In step S102, the second setup unit 102 of the key distribution device S generates the public parameter Params' and the master secret key msk' of the key distribution device S based on the setup algorithm IBE-Setup for ID-base encryption. The public parameter Params' and the master secret key msk' are stored in the storage 100.

In step S203, the user ID transmission unit 203 of the communication devices $U_i$ transmits $U_i$ to the key distribution device S so as to register a user ID in the key distribution device S. Since the user ID may be an arbitrary letter string which enables identification of a user, a mail address, for example, may be used.

In step S103, the user ID reception unit 103 of the key distribution device S receives $U_i$ which is a user ID. In step S104, the initial key generation unit 104 of the key distribution device S generates an initial key $sk_{U\_i} \leftarrow$ IBE-Der(Params', msk', $U_i$) of the communication devices $U_i$ based on the key derivation algorithm IBE-Der for ID-base encryption and transmits the initial key $sk_{U\_i}$ to the communication devices $U_i$.

In step S204, the initial key reception unit 204 of the communication devices $U_i$ receives the initial key $sk_{U\_i}$ of the communication devices $U_i$. The communication devices $U_i$ store the initial key $sk_{U\_i}$ in the storage 200.

In step S105, the secret string generation unit 105 of the key distribution device S generates secret strings $(st_s, st'_s)$ used in the twisted pseudo-random function as $st_s \in_R FS_\kappa$ and $st'_s \in \{0, 1\}_\kappa$. The secret strings $(st_s, st'_s)$ are stored in the storage 100.

In step S205, the secret string generation unit 205 of the communication devices $U_i$ generates secret strings $(st_i, st'_i)$ used in the twisted pseudo-random function as $st_i \in_R FS_\kappa$ and $st'_i \in \{0, 1\}_\kappa$. The secret strings $(st_i, st'_i)$ are stored in the storage 200.

<Session Key Distribution>

Figure 4:
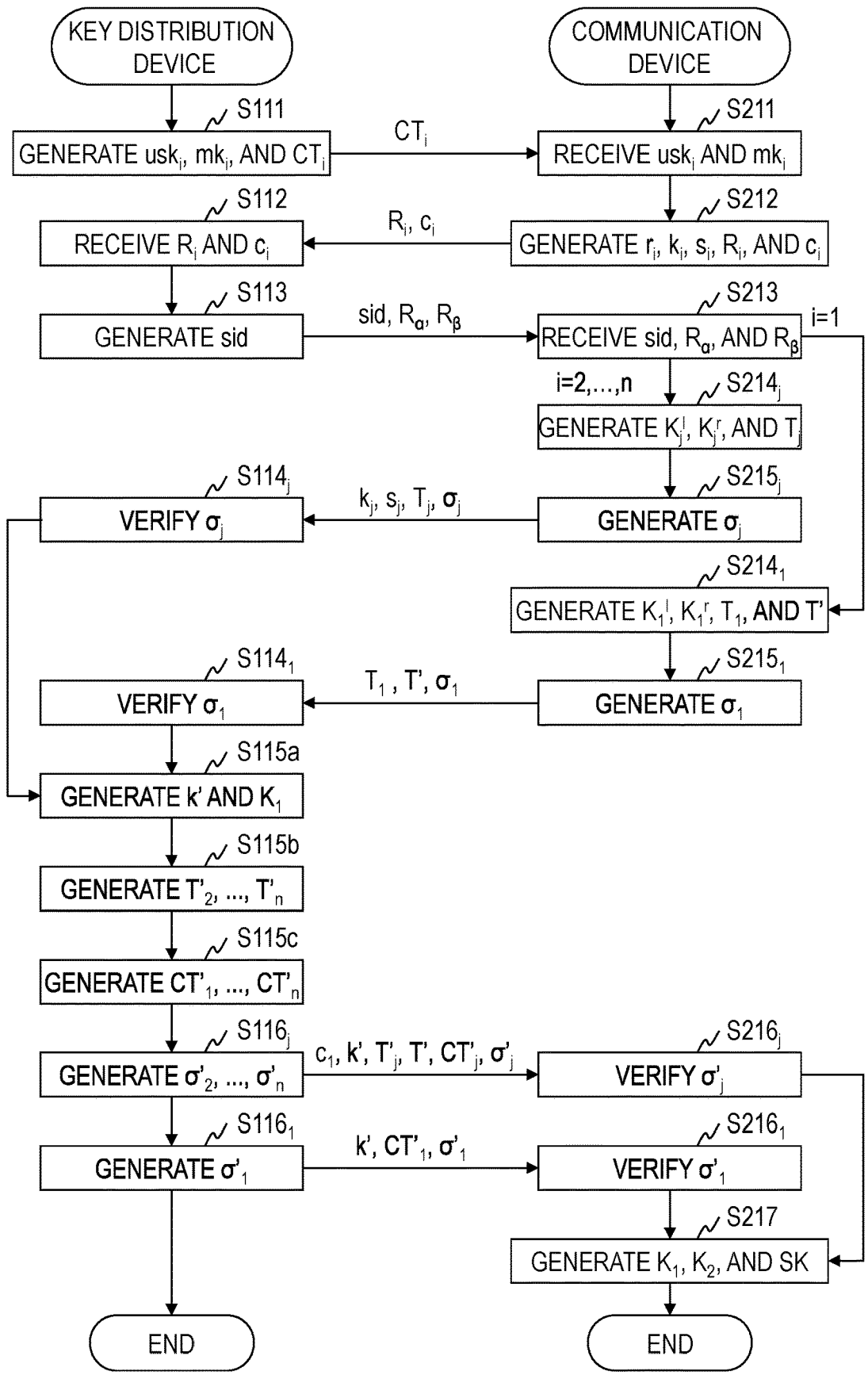
FIG. 4 illustrates a processing flow (session key distribution) in the key exchange method.

A processing procedure for session key distribution in the key exchange method according to the embodiment will be described with reference to FIG. 4.

In the following description, it is assumed that arbitrary n ($\leq N$) pieces of communication devices $U_i$ ($i \in \{1, \ldots, n\}$) among N pieces of communication devices $2_1, \ldots, 2_N$ share a session key SK which is a common key.

In step S111, in the case where a session is started by the communication devices $U_i$ and the session is the first session in a time frame TF of the communication devices $U_i$, the user key transmission unit 111 of the key distribution device S generates a user secret key $usk_i \leftarrow$ Der(Params, msk, $A_i$) of the communication devices $U_i$ based on the key derivation algorithm Der for functional encryption with current time and attribution respectively used as time and $A_i = (U_i, \text{time})$. Further, the user key transmission unit 111 generates a MAC key $mk_i \leftarrow$ MGen of the communication devices $U_i$ based on the key generation algorithm MGen for a message authentication code. Then, the user key transmission unit 111 encrypts the user secret key $usk_i$ and the MAC key $mk_i$ based on the encryption algorithm IBE-Enc for ID-base encryption so as to generate the cipher text $CT_i \leftarrow$ IBE-Enc(Params', $U_i$, ($usk_i, mk_i$)). The user key transmission unit 111 transmits the cipher text $CT_i$ to each of the communication devices $U_i$.

In step S211, the user key reception unit 211 of the communication devices $U_i$ decrypts the cipher text $CT_i$, which is received from the key distribution device S, by using the initial key $sk_{U\_i}$ of the communication devices $U_i$ based on the decryption algorithm IBE-Dec for ID-base encryption so as to obtain a user secret key and a MAC key ($usk_i, mk_i) \leftarrow$ IBE-Dec$_{sk\_Ui}$($CT_i$, Params'). The user key reception unit 211 stores the user secret key $usk_i$ and the MAC key $mk_i$ in the storage 200.

In step S212, the first key generation unit 212 of the communication devices $U_i$ generates $\tilde{r}_i \in_R \{0, 1\}^\kappa$, $\tilde{r}'_i \in_R FS_\kappa$, $\tilde{k}_i \in_R \{0, 1\}^\kappa$, $\tilde{k}'_i \in_R FS_\kappa$, $\tilde{s}_i \in_R \{0, 1\}^\kappa$, and $\tilde{s}'_i \in_R FS_\kappa$ and computes $r_i = tPRF(\tilde{r}_i, \tilde{r}'_i, st_i, st'_i)$, $k_i = tPRF(\tilde{k}_i, \tilde{k}'_i, st_i, st'_i)$, and $s_i = tPRF(\tilde{s}_i, \tilde{s}'_i, st_i, st'_i)$ based on the twisted pseudo-random function tPRF. Further, the first key generation unit 212 computes $R_i = g^{r_i}$ and $c_i = g^{k_i} h^{s_i}$. Then, the first key generation unit 212 transmits $(R_i, c_i)$ to the key distribution device S.

In step S112, the key distribution device S receives $(R_i, c_i)$ from the communication devices $U_i$. At this time, the key distribution device S stands by until the key distribution device S receives $(R_1, c_1), \ldots, (R_n, c_n)$ respectively from all of the communication devices $U_1, \ldots, U_n$.

In step S113, the session ID generation unit 113 of the key distribution device S generates $sid = H(c_1, \ldots, c_n)$ by using $c_1, \ldots, c_n$, which are respectively received from the communication devices $U_1, \ldots, U_n$, based on the target-collision resistant hash function H. Further, the session ID generation unit 113 selects one piece of communication device as a representative from n pieces of communication devices $U_1, \ldots, U_n$. A representative may be arbitrarily selected. For example, a predetermined communication device with the highest priority or a communication device which has started a session most recently may be selected. It is assumed that the communication device $U_1$ is selected, and $U_1$ is called a representative communication device in this example. Further, n−1 pieces of communication devices $U_j$ ($j \in \{2, \ldots, n\}$) other than the representative communication device $U_1$ are called general communication devices. The session ID generation unit 113 computes α and β as the following formulas and transmits $(sid, R_\alpha, R_\beta)$ to each of the communication devices $U_i$. Further, the key distribution device S notifies $U_1$ that $U_1$ is the representative communication device.

$$\alpha = \begin{cases} i-1 & \text{if } i-1 \geq 1 \\ i-1+n & \text{if } i-1 < 1 \end{cases},$$

$$\beta = \begin{cases} i+1 & \text{if } i+1 \leq n \\ i+1-n & \text{if } i+1 > n \end{cases}$$

In step S213, each of the communication devices $U_i$ receives $(sid, R_\alpha, R_\beta)$ from the key distribution device S. The communication devices $U_i$ execute the following processing as soon as the communication devices $U_i$ receive $(sid, R_\alpha, R_\beta)$. In the case where $i=2, \ldots, n$ holds, that is, the case where the communication devices $U_i$ are the communication devices $U_j$ (i=j), the processing is progressed to step $S214_j$. In the case where i=1 holds, that is, the case where the communication device $U_i$ is the representative communication device $U_1$, the processing is progressed to step $S214_1$.

In step $S214_j$, the second key generation unit 214 of the general communication devices $U_j$ generates $K_j^l$ by using (sid, $R_\alpha^{r\_j}$) based on the pseudo-random function F and generates $K_j^r$ by using (sid, $R_\beta^{r\_j}$) based on the pseudo-random function F so as to compute $T_j$ by an exclusive OR of $K_j^l$ and $K_j^r$, as the following formulas.

$$K_j^l = F(\text{sid}, R_\alpha^{r_j}),$$

$$K_j^r = F(\text{sid}, R_\beta^{r_j}),$$

$$T_j = K_j^l \oplus K_j^r$$

In step $S215_j$, the authentication tag generation unit 215 of the general communication devices $U_j$ generates an authentication tag $\sigma_j = \text{Tag}_{mk\_j}(R_j, c_j, R_\alpha, R_\beta, k_j, s_j, T_j, U_j, \text{sid})$ by using the MAC key $mk_j$ based on the tag generation algorithm Tag for a message authentication code. The authentication tag generation unit 215 transmits ($k_j, s_j, T_j, \sigma_j$) to the key distribution device S.

In step $S214_1$, the second key generation unit 214 of the representative communication device $U_1$ generates $K_1^l$ by using (sid, $R_n^{r-1}$) based on the pseudo-random function F and generates $K_1^r$ by using (sid, $R_2^{r-1}$) based on the pseudo-random function F so as to compute $T_1$ by the exclusive OR of $K_1^l$ and $K_1^r$ and compute T' by the exclusive OR of $K_1^l$ and $k_1 \| s_1$, as the following formulas. Here, $\|$ denotes a concatenation operator.

$$K_1^l = F(\text{sid}, R_n^{r_1}),$$

$$K_1^r = F(\text{sid}, R_2^{r_1})$$

$$T_1 = K_1^l \oplus K_1^r$$

$$T' = K_1^l \oplus (k_1 \| s_1)$$

In step $S215_1$, the authentication tag generation unit 215 of the representative communication device $U_1$ generates an authentication tag $\sigma_1 = \text{Tag}_{mk\_1}(R_1, c_1, R_n, R_2, T_1, T', U_1, \text{sid})$ by using the MAC key $mk_1$ based on the tag generation algorithm Tag for a message authentication code. The authentication tag generation unit 215 transmits ($T_1, T', \sigma_1$) to the key distribution device S.

In step $S114_j$, the authentication tag verification unit 114 of the key distribution device S receives ($k_j, s_j, T_j, \sigma_j$) from the general communication devices $U_j$ with respect to $j = 2, \ldots, n$ and verifies $\text{Ver}_{mk\_j}(R_j, c_j, R_\alpha, R_\beta, k_j, s_j, T_j, U_j, \text{sid}, \sigma_j)$ by using the MAC key $mk_j$ of the general communication devices $U_j$ based on the verification algorithm Ver for a message authentication code. When the authentication tag $\sigma_j$ is invalid, the authentication tag verification unit 114 ends the session of the general communication devices $U_j$. Further, the authentication tag verification unit 114 verifies whether or not $c_j = g^{k\_j} h^{s\_j}$ is satisfied with respect to $j = 2, \ldots, n$. When $c_j = g^{k\_j} h^{s\_j}$ is not satisfied, the authentication tag verification unit 114 ends the session of the general communication devices $U_j$.

In step $S114_1$, the authentication tag verification unit 114 of the key distribution device S receives ($T_1, T', \sigma_1$) from the representative communication device $U_1$ and verifies $\text{Ver}_{mk\_1}(R_1, c_1, R_n, R_2, T_1, T', U_1, \text{sid}, \sigma_1)$ by using the MAC key $mk_1$ of the representative communication device $U_1$ based on the verification algorithm Ver for a message authentication code. When the authentication tag $\sigma_1$ is invalid, the authentication tag verification unit 114 ends the session of the representative communication device $U_1$.

In step $S115a$, the third key generation unit 115 of the key distribution device S generates $\tilde{k}_s \in_R \{0, 1\}^\kappa$, $\tilde{k}'_s \in_R FS_\kappa$, $\tilde{K}_1 \in_R \{0, 1\}^\kappa$, and $\tilde{K}'_1 \in_R FS_\kappa$ so as to compute $k_S = \text{tPRF}(\tilde{k}_s, \tilde{k}'_s, st_s, st'_s)$ and $K_1 = \text{tPRF}'(\tilde{K}_1, \tilde{K}'_1, st_s, st'_s)$ based on the twisted pseudo-random function tPRF. Further, the third key generation unit 115 computes k' by the following formula.

$$k' = (\oplus_{2 \leq j \leq n} k_j) \oplus k_S$$

In step $S115b$, the third key generation unit 115 of the key distribution device S computes $T'_j$ with respect to $j = 2, \ldots, n$ by the following formula.

$$T'_j = \oplus_{1 \leq i \leq j-1} T_i$$

In step $S115c$, the third key generation unit 115 of the key distribution device S encrypts a common key $K_1$ with respect to $i = 1, \ldots, n$ based on the encryption algorithm FEnc for functional encryption with the access structure $P_i = (ID = U_i) \wedge (\text{time} \in TF)$ so as to generate a cipher text $CT'_i = \text{FEnc}(\text{Params}, P_i, K_1)$. Here, ID is a predicate variable representing a communication device and TF is a predicate variable representing a time frame of the communication device.

In step $S116_j$, the authentication tag generation unit 116 of the key distribution device S generates an authentication tag $\sigma'_j = \text{Tag}_{mk\_j}(R_j, c_j, R_\alpha, R_\beta, k_j, s_j, T_j, U_j, \text{sid}, c_1, k', T'_j, T', CT'_j)$ with respect to $j = 2, \ldots, n$ by using the MAC key $mk_j$ of the general communication devices $U_j$ based on the tag generation algorithm Tag for a message authentication code. The authentication tag generation unit 116 transmits ($c_1, k', T'_j, T', CT'_j, \sigma'_j$) to the general communication devices $U_j$.

In step $S116_1$, the authentication tag generation unit 116 of the key distribution device S generates an authentication tag $\sigma'_1 = \text{Tag}_{mk\_1}(R_1, c_1, R_n, R_2, T_1, T', U_1, \text{sid}, k', CT'_1)$ by using the MAC key $mk_1$ of the representative communication device $U_1$ based on the tag generation algorithm Tag for a message authentication code. The authentication tag generation unit 116 transmits ($k', CT'_1, \sigma'_1$) to the representative communication device $U_1$.

In step $S216_j$, the authentication tag verification unit 216 of the general communication devices $U_j$ receives ($c_1, k', T'_j, T', CT'_j, \sigma'_j$) from the key distribution device S and verifies $\text{Ver}_{mk\_j}(R_j, c_j, R_\alpha, R_\beta, k_j, s_j, T_j, U_j, \text{sid}, c_1, k', T'_j, T', CT'_j, \sigma'_j)$ by using the MAC key $mk_j$ of the general communication devices $U_j$ based on the verification algorithm Ver for a message authentication code. When the authentication tag $\sigma'_j$ is invalid, the authentication tag verification unit 216 ends the session of the general communication devices $U_j$. Further, the authentication tag verification unit 216 computes $K_1^l$ by an exclusive OR of $T'_j$ and $K_j^l$ and computes $k_1 \| s_1$ by an exclusive OR of T' and $K_1^l$, as the following formulas.

$$K_1^l = T'_j \oplus K_j^l,$$

$$k_1 \| s_1 = T' \oplus K_1^l$$

Then, the authentication tag verification unit 216 verifies whether or not $c_1 = g^{k\_1} h^{s\_1}$ is satisfied. When $c_1 = g^{k\_1} h^{s\_1}$ is not satisfied, the authentication tag verification unit 216 ends the session of the general communication devices $U_j$.

In step $S216_1$, the authentication tag verification unit 216 of the representative communication device $U_1$ receives ($k', CT'_1, \sigma'_1$) from the key distribution device S and verifies $\text{Ver}_{mk\_1}(R_1, c_1, R_n, R_2, T_1, T', U_1, \text{sid}, k', CT'_1, \sigma'_1)$ by using the MAC key $mk_1$ of the representative communication device $U_1$ based on the verification algorithm Ver for a message authentication code. When the authentication tag σ'$_1$ is invalid, the authentication tag verification unit 216 ends the session of the representative communication device U$_1$.

In step S217, the session key generation unit 217 of the communication devices U$_i$ decrypts the common key K$_1$←FDec$_{usk\_i}$(CT'$_i$, P$_i$) by using the user secret key usk$_i$ of the communication devices U$_i$ based on the decryption algorithm FDec for functional encryption. Further, the session key generation unit 217 computes a common key K$_2$ based on the pseudo-random function F' as the following formula.

$$K_2 = F'(sid, k' \oplus k_1)$$

Then, the session key generation unit 217 computes a session key SK based on the pseudo-random function F" as the following formula.

$$SK = F''(sid, K_1) \oplus F''(sid, K_2)$$

According to the key exchange technology of the present invention, a plurality of users can share a common key by preliminarily registering only user IDs as information of users who may perform key exchange, in the above-described configuration. Especially, a plurality of users can share the common key K$_2$ and the session key SK without leaking any information other than user IDs with respect to the key distribution device S. Further, the whole computational complexity required for the key exchange has been O(log n) when the number of users is set as n in the related art, but according the present invention, the whole computational complexity is the constant number of times which is the number of users, that is, O(1), enabling key exchange with smaller computational complexity than the related art.

Further, since a key can be issued by using existing IDs based on ID-base encryption, a public key database which is required for general public key encryption does not need to be prepared, reducing operational cost advantageously.

A processing procedure of the key exchange method in new user addition to a plurality of users sharing a session key will be described below. It is assumed that the session key SK has been already shared among the communication devices U$_i$ (i∈{1, . . . , n}). Each of the communication devices U$_i$ stores secret information to be used for user addition in the storage 200 after the end of the key exchange processing (after S217). The representative communication device U$_1$ stores secret information H$_1^l$, H$_1^r$, and r computed by the following formulas in the storage 200.

$$H_1^l = R_n^{r_1}$$

$$H_1^r = R_2^{r_1}$$

$$r = F'''(sid, K_1) \oplus F'''(sid, K_2)$$

The general communication devices U$_j$ (j∈{2, . . . , n}) store secret information H$_j^l$, H$_j^r$, and r computed by the following formulas in the storage 200.

$$H_j^l = R_{i-1}^{r_j}$$

$$H_n^r = R_{i+1}^{r_j}$$

$$r = F'''(sid, K_1) \oplus F'''(sid, K_2)$$

<User Addition>

Figure 5:
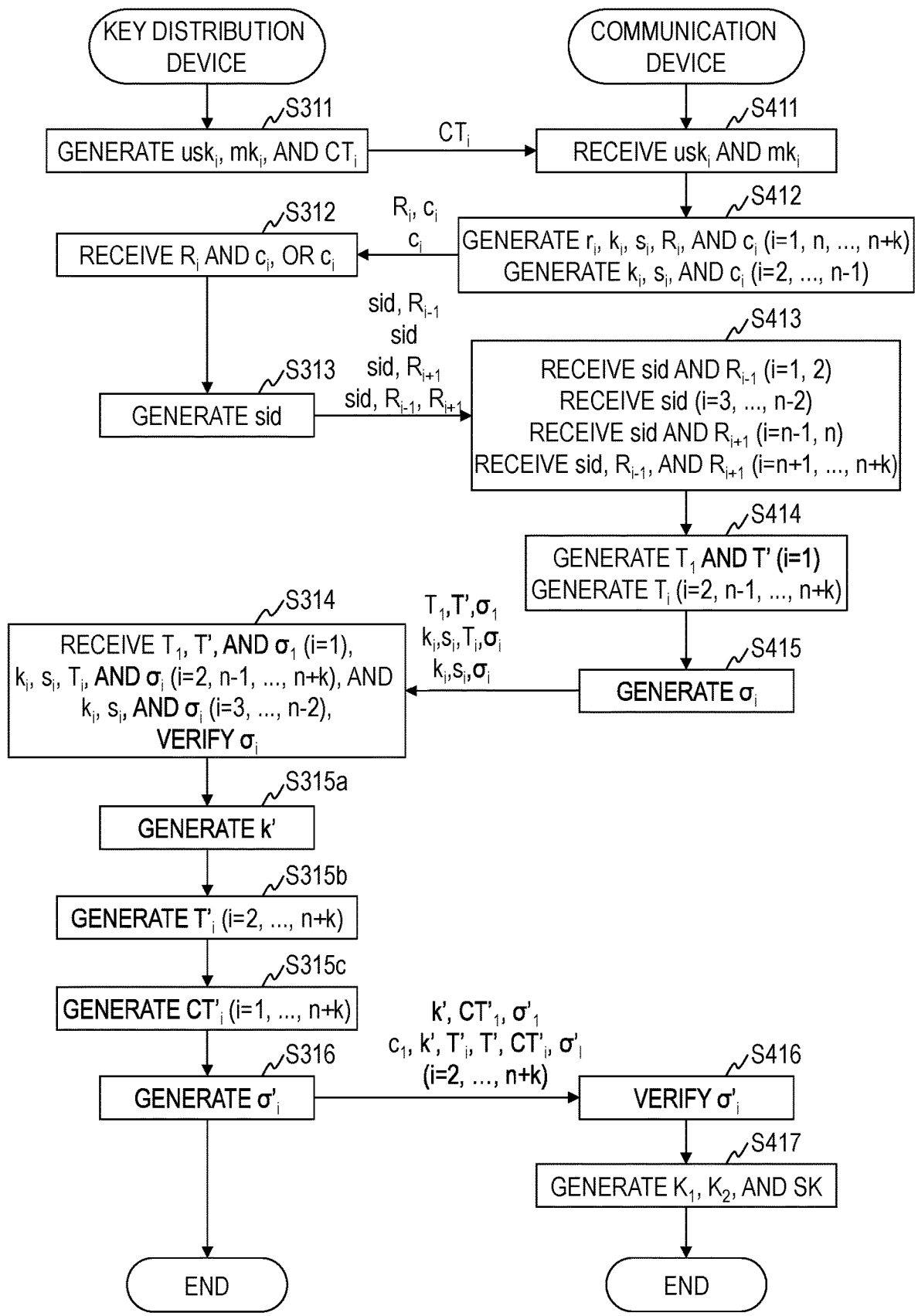
FIG. 5 illustrates a processing flow (user addition) in the key exchange method.

A processing procedure of user addition in the key exchange method according to the embodiment will be described with reference to FIG. 5.

It is assumed that communication devices U$_{n+1}$, . . . U$_{n+k}$ (k is an integer which is 1 or larger and n+k is an integer which is N or smaller) newly join a session established by the communication devices U$_1$, . . . , U$_n$.

Hereinafter, it is assumed that i∈{1, . . . , n+k} holds.

In step S311, in the case where a session is started by the communication device U$_i$ (i=1, . . . , n+k) and the session is the first session in a time frame TF' of the communication devices U$_i$, the user key transmission unit 111 of the key distribution device S generates a user secret key usk$_i$←Der (Params, msk, A$_i$) of the communication device U$_i$ based on the key derivation algorithm Der for functional encryption, with current time and attribution respectively used as time and A$_i$=(U$_i$, time). Further, the user key transmission unit 111 generates a MAC key mk$_i$←MGen of the communication device U$_i$ based on the key generation algorithm MGen for a message authentication code. Then, the user key transmission unit 111 encrypts the user secret key usk$_i$ and the MAC key mk$_i$ based on the encryption algorithm IBE-Enc for ID-base encryption so as to generate the cipher text CT$_i$←IBE-Enc(Params', U$_i$, (usk$_i$, mk$_i$)). The user key transmission unit 111 transmits the cipher text CT$_i$ to each of the communication devices U$_i$.

In step S411, the user key reception unit 211 of the communication devices U$_i$ decrypts the cipher text CT$_i$, which is received from the key distribution device S, by using the initial key sk$_{U\_i}$ of the communication devices U$_i$ based on the decryption algorithm IBE-Dec for ID-base encryption so as to obtain a user secret key and a MAC key (usk$_i$, mk$_i$)←IBE-Dec$_{sk\_Ui}$(CT$_i$, Params'). The user key reception unit 211 stores the user secret key usk$_i$ and the MAC key mk$_i$ in the storage 200.

In step S412, in the case of i∈{1}∪[n, n+k], the first key generation unit 212 of the communication device U$_i$ generates ˜r$_i$∈$_R${0, 1}$^κ$, ˜r'$_i$∈$_R$FS$_κ$, ˜k$_i$∈$_R${0, 1}$^κ$, ˜k'$_i$∈$_R$FS$_κ$, ˜s$_i$∈$_R${0, 1}$^κ$, and ˜s'$_i$∈$_R$FS$_κ$ so as to compute r$_i$=tPRF(˜r$_i$, ˜r'$_i$, st$_i$, st'$_i$), k$_i$=tPRF(˜k$_i$, ˜k'$_i$, st$_i$, st'$_i$), and s$_i$=tPRF(˜s$_i$, ˜s'$_i$, st$_i$, st'$_i$) based on the twisted pseudo-random function tPRF. Further, the first key generation unit 212 computes R$_i$=g$^{r\_i}$ and c$_i$=g$^{k\_i}$h$^{s\_i}$. Then, the first key generation unit 212 transmits (R$_i$, c$_i$) to the key distribution device S.

In the case of i∈[2, n−1], the first key generation unit 212 of the communication devices U$_i$ generates ˜k$_i$∈$_R${0, 1}$^κ$, ˜k'$_i$∈$_R$FS$_κ$, ˜s$_i$∈$_R${0, 1}$^κ$, and ˜S'$_i$∈$_R$FS$_κ$ and computes k$_i$=tPRF(˜k$_i$, ˜k'$_i$, st$_i$, st'$_i$) and s$_i$=tPRF(˜s$_i$, ˜s'$_i$, st$_i$, st'$_i$) based on the twisted pseudo-random function tPRF. Further, the first key generation unit 212 computes c$_i$=g$^{k\_i}$h$^{s\_i}$. Then, the first key generation unit 212 transmits c$_i$ to the key distribution device S.

In step S312, the key distribution device S receives (R$_i$, c$_i$) or c$_i$ from the communication devices U$_i$. At this time, the key distribution device S stands by until the key distribution device S receives (R$_1$, c$_1$), c$_2$, . . . , c$_{n-1}$, (R$_n$, c$_n$), . . . , (R$_{n+k}$, c$_{n+k}$) respectively from all of the communication devices U$_1$, . . . , U$_{n+k}$.

In step S313, the session ID generation unit 113 of the key distribution device S generates sid=H(c$_1$, . . . , c$_{n+k}$) by using c$_1$, . . . , c$_{n+k}$, which are received from the communication devices U$_1$, . . . , U$_{n+k}$, based on the target-collision resistant hash function H. Further, the session ID generation unit 113 selects one piece of communication device as a representative from k+2 pieces of communication devices U$_1$, U$_n$, U$_{n+1}$, . . . , U$_{n+k}$. It is assumed that the communication device U$_1$ is selected, and U$_1$ is called a representative communication device in this example. Further, n+k−1 pieces of communication devices U$_i$ (i∈{2, . . . , n+k}) other than the representative communication device U$_1$ are called general communication devices. In the case of i∈[n+1, n+k], the session ID generation unit 113 transmits (sid, R$_{i+1}$) to each of the communication devices $U_i$ (here, $R_{n+k+1}=R_1$). Further, in the case of $i\in[1, 2]$, the session ID generation unit 113 transmits (sid, $R_{i-1}$) to each of the communication devices $U_i$ (here, $R_0=R_{n+k}$) In the case of $i\in[3, n-2]$, the session ID generation unit 113 transmits sid to each of the communication devices $U_i$. In the case of $i\in[n-1, n]$, the session ID generation unit 113 transmits (sid, $R_{i+1}$) to each of the communication devices $U_i$. Further, the key distribution device S notifies $U_1$ that $U_1$ is the representative communication device.

In step S413, each of the communication devices $U_i$ receives any of (sid, $R_{i-1}$, $R_{i+1}$), (sid, $R_{i-1}$), sid, and (sid, $R_{i+1}$) from the key distribution device S. Specifically, in the case of $i\in[n+1, n+k]$, the communication devices $U_i$ receive (sid, $R_{i-1}$, $R_{i+1}$) (here, $R_{n+k+1}=R_1$). In the case of $i\in[1, 2]$, the communication devices $U_i$ receive (sid, $R_{i-1}$) (here, $R_0=R_{n+k}$). In the case of $i\in[3, n-2]$, the communication devices $U_i$ receive sid. In the case of $i\in[n-1, n]$, the communication devices $U_i$ receive (sid, $R_{i+1}$).

The communication devices $U_i$ execute the processing of step S414 and step S415 as soon as the communication devices $U_i$ receive any of (sid, $R_{i-1}$, $R_{i+1}$), (sid, $R_{i-1}$), sid, and (sid, $R_{i+1}$). This processing is executed for six cases which are the case of $i=1$, the case of $i=2$, the case of $i\in[3, n-2]$, the case of $i=n-1$, the case of $i=n$, and the case of $i\in[n+1, n+k]$. However, in the case of $i\in[3, n-2]$, no processing is performed in step S414. That is, as soon as the communication devices $U_i$ receive sid, the communication devices $U_i$ execute the processing of step S415.

In the case of $i=1$, in step S414, the second key generation unit 214 of the representative communication device $U_1$ generates $K_1^l$ by using (sid, $R_{n+k}^{r-1}$) based on the pseudo-random function F and generates $K_1^r$ by using (sid, $g^{r-1 r}$) based on the pseudo-random function F so as to compute $T_1$ by an exclusive OR of $K_1^l$ and $K_1^r$ and compute T' by the exclusive OR of $K_1^l$ and $k_1\|s_1$, as the following formulas. Here, $\|$ denotes a concatenation operator.

$$K_1^l=F(\text{sid},R_{n+k}^{ri}),$$

$$K_1^r=F(\text{sid},g^{r1r}),$$

$$T_1=K_1^l\oplus K_1^r,$$

$$T'=K_1^l\oplus(k_1\|s_1)$$

In step S415, the authentication tag generation unit 215 of the representative communication device $U_1$ generates an authentication tag $\sigma_1=\text{Tag}_{mk\_1}(R_1, c_1, R_{n+k}, T_1, T', U_1, \text{sid})$ by using the MAC key $mk_1$ based on the tag generation algorithm Tag for a message authentication code. The authentication tag generation unit 215 transmits ($T_1$, T', $\sigma_1$) to the key distribution device S.

In the case of $i=2$, in step S414, the second key generation unit 214 of the communication device $U_2$ generates $K_2^l$ by using (sid, $R_1^r$) based on the pseudo-random function F and generates $K_2^r$ by using (sid, $g^r$) based on the pseudo-random function F so as to compute $T_2$ by an exclusive OR of $K_2^l$ and $K_2^r$, as the following formulas.

$$K_2^l=F(\text{sid},R_1^r),$$

$$K_2^r=F(\text{sid},g^r),$$

$$T_2=K_2^l\oplus K_2^r$$

In step S415, the authentication tag generation unit 215 of the communication device $U_2$ generates an authentication tag $\sigma_2=\text{Tag}_{mk\_2}(c_2, R_1, k_2, s_2, T_2, U_2, \text{sid})$ by using the MAC key $mk_2$ based on the tag generation algorithm Tag for a message authentication code. The authentication tag generation unit 215 transmits ($k_2$, $s_2$, $T_2$, $\sigma_2$) to the key distribution device S.

In the case of $i\in[3, n-2]$, in step S415, the authentication tag generation unit 215 of the communication devices $U_i$ generates an authentication tag $\sigma_i=\text{Tag}_{mk\_i}(c_i, k_i, s_i, U_i, \text{sid})$ by using the MAC key $mk_i$ based on the tag generation algorithm Tag for a message authentication code. The authentication tag generation unit 215 transmits ($k_i$, $s_i$, $\sigma_i$) to the key distribution device S.

In the case of $i=n-1$, in step S414, the second key generation unit 214 of the communication device $U_{n-1}$ generates $K_{n-1}^l$ by using (sid, $g^r$) based on the pseudo-random function F and generates $K_{n-1}^r$ by using (sid, $R_n^r$) based on the pseudo-random function F so as to compute $T_{n-1}$ by an exclusive OR of $K_{n-1}^l$ and $K_{n-1}^r$, as the following formulas.

$$K_{n-1}^l=F(\text{sid},g^r),$$

$$K_{n-1}^r=F(\text{sid},R_n^r),$$

$$T_{n-1}=K_{n-1}^l\oplus K_{n-1}^r$$

In step S415, the authentication tag generation unit 215 of the communication device $U_{n-1}$ generates an authentication tag $\sigma_{n-1}=\text{Tag}_{mk\_n-1}(c_{n-1}, R_n, k_{n-1}, s_{n-1}, T_{n-1}, U_{n-1}, \text{sid})$ by using the MAC key $mk_{n-1}$ based on the tag generation algorithm Tag for a message authentication code. The authentication tag generation unit 215 transmits ($k_{n-1}$, $s_{n-1}$, $T_{n-1}$, $\sigma_{n-1}$) to the key distribution device S.

In the case of $i=n$, in step S414, the second key generation unit 214 of the communication device $U_n$ generates $K_n^l$ by using (sid, $R_n^r$) based on the pseudo-random function F and generates $K_n^r$ by using (sid, $R_{n+1}^{r-n}$) based on the pseudo-random function F so as to compute $T_n$ by an exclusive OR of $K_n^l$ and $K_n^r$, as the following formulas.

$$K_n^l=F(\text{sid},R_n^r),$$

$$K_n^r=F(\text{sid},R_{n+1}^{rn}),$$

$$T_n=K_n^l\oplus K_n^r$$

In step S415, the authentication tag generation unit 215 of the communication device $U_n$ generates an authentication tag $\sigma_n=\text{Tag}_{mk\_n}(R_n, c_n, R_{n+1}, k_n, s_n, T_n, U_n, \text{sid})$ by using the MAC key $mk_n$ based on the tag generation algorithm Tag for a message authentication code. The authentication tag generation unit 215 transmits ($k_n$, $s_n$, $T_n$, $\sigma_n$) to the key distribution device S.

In the case of $i\in[n+1, n+k]$, in step S414, the second key generation unit 214 of the communication device $U_i$ generates $K_i^l$ by using (sid, $R_{i-1}^{r-i}$) based on the pseudo-random function F and generates $K_i^r$ by using (sid, $R_{i+1}^{r-1}$) based on the pseudo-random function F so as to compute $T_i$ by an exclusive OR of $K_i^l$ and $K_i^r$, as the following formulas.

$$K_i^l=F(\text{sid},R_{i-1}^{ri}),$$

$$K_i^r=F(\text{sid},R_{i+1}^{ri}),$$

$$T_i=K_i^l\oplus K_i^r$$

In step S415, the authentication tag generation unit 215 of the communication devices $U_i$ generates an authentication tag $\sigma_i=\text{Tag}_{mk\_i}(R_i, c_i, R_{i-1}, R_{i+1}, k_i, s_i, T_i, U_i, \text{sid})$ by using the MAC key $mk_i$ based on the tag generation algorithm Tag for a message authentication code. The authentication tag generation unit 215 transmits ($k_i$, $s_i$, $T_i$, $\sigma_i$) to the key distribution device S.

In step S314, the authentication tag verification unit 114 of the key distribution device S receives $(T_1, T', \sigma_1)$ from the representative communication devices $U_1$, receives $(k_i, s_i, T_i, \sigma_i)$ from the general communication devices $U_i$ with respect to $i=2, n-1, \ldots, n+k$, and receives $(k_i, s_i, \sigma_i)$ from the general communication device $U_i$ with respect to $i=3, \ldots, n-2$ so as to perform verification based on the verification algorithm Ver for a message authentication code. When the authentication tag $\sigma_i$ ($i=1, \ldots, n+k$) is invalid, the authentication tag verification unit 114 ends the session of the communication devices $U_i$. Further, the authentication tag verification unit 114 verifies whether or not $c_i=g^{k\_i}h^{s\_i}$ is satisfied with respect to $i=2, \ldots, n+k$. When $c_i=g^{k\_i}h^{s\_i}$ is not satisfied, the authentication tag verification unit 114 ends the session of the general communication devices $U_i$.

In step S315a, the third key generation unit 115 of the key distribution device S generates $\tilde{k}_s \in_R \{0, 1\}^\kappa$ and $\tilde{k}'_s \in_R FS_\kappa$ so as to compute $k_s = tPRF(\tilde{k}_s, \tilde{k}'_s, st_s, st'_s)$ based on the twisted pseudo-random function tPRF. Further, the third key generation unit 115 computes k' by the following formula.

$$k' = (\oplus_{2 \le i \le n+k} k_i) \oplus k_S$$

In step S315b, the third key generation unit 115 of the key distribution device S computes $T'_i$ with respect to $i=2, \ldots, n+k$ by the following formula.

$$T'_i = \oplus_{1 \le j \le i-1} T_j$$

Here, $T_i$ is nil with respect to $i=3, \ldots, n-1$. Accordingly, $T_3' = \ldots = T_{n-1}' = 0$ is obtained.

In step S315c, the third key generation unit 115 of the key distribution device S encrypts a common key $K_1$ with respect to $i=1, \ldots, n+k$ based on the encryption algorithm FEnc for functional encryption with the access structure $P_i = (ID=U_i)^\wedge(time \in TF)$ so as to generate a cipher text $CT'_i = FEnc(Params, P_i, K_1)$. Here, ID is a predicate variable representing a communication device and TF is a predicate variable representing a time frame of the communication device. Further, the common key $K_1$ is the one generated in step S115c.

In step S316, the key distribution device S generates an authentication tag and transmits the authentication tag to the communication devices $U_i$. This processing is executed for six cases which are the case of $i=1$, the case of $i=2$, the case of $i \in [3, n-2]$, the case of $i=n-1$, the case of $i=n$, and the case of $i \in [n+1, n+k]$.

In the case of $i=1$, the authentication tag generation unit 116 of the key distribution device S generates an authentication tag $\sigma'_1 = Tag_{mk\_1}(R_1, c_1, R_{n+k}, T_1, T', U_1, sid, k', CT'_1)$ by using the MAC key $mk_1$ of the representative communication device $U_1$ based on the tag generation algorithm Tag for a message authentication code. The authentication tag generation unit 116 transmits $(k', CT'_1, \sigma'_1)$ to the representative communication device $U_1$.

In the case of $i=2$, the authentication tag generation unit 116 of the key distribution device S generates an authentication tag $\sigma'_2 = Tag_{mk\_2}(c_2, R_1, k_2, s_2, T_2, U_2, sid, c_1, k', T'_2, T', CT'_2)$ by using the MAC key $mk_2$ of the general communication device $U_2$ based on the tag generation algorithm Tag for a message authentication code. The authentication tag generation unit 116 transmits $(c_1, k', T'_2, T', CT'_2, \sigma'_2)$ to the general communication device $U_2$.

In the case of $i \in [3, n-2]$, the authentication tag generation unit 116 of the key distribution device S generates an authentication tag $\sigma'_i = Tag_{mk\_i}(c_i, k_i, s_i, U_i, sid, c_1, k', T'_i, T', CT'_i)$ by using the MAC key $mk_i$ of the general communication devices $U_i$ based on the tag generation algorithm Tag for a message authentication code. The authentication tag generation unit 116 transmits $(c_1, k', T'_i, T', CT'_i, \sigma'_i)$ to the general communication device $U_i$.

In the case of $i=n-1$, the authentication tag generation unit 116 of the key distribution device S generates an authentication tag $\sigma'_{n-1} = Tag_{mk\_n-1}(C_{n-1}, R_n, k_{n-1}, s_{n-1}, T_{n-1}, U_{n-1}, sid, c_1, k', T'_{n-1}, T', CT'_{n-1})$ by using the MAC key $mk_{n-1}$ of the general communication device $U_{n-1}$ based on the tag generation algorithm Tag for a message authentication code. The authentication tag generation unit 116 transmits $(c_1, k', T'_{n-1}, T', CT'_{n-1}, \sigma'_{n-1})$ to the general communication device $U_{n-1}$.

In the case of $i=n$, the authentication tag generation unit 116 of the key distribution device S generates an authentication tag $\sigma'_n = Tag_{mk\_n}(R_n, c_n, R_{n+1}, k_n, s_n, T_n, U_n, sid, c_1, k', T'_n, T', CT'_n)$ by using the MAC key $mk_n$ of the general communication devices $U_n$ based on the tag generation algorithm Tag for a message authentication code. The authentication tag generation unit 116 transmits $(c_1, k', T'_n, T', CT'_n, \sigma'_n)$ to the general communication device $U_n$.

In the case of $i \in [n+1, n+k]$, the authentication tag generation unit 116 of the key distribution device S generates an authentication tag $\sigma'_i = Tag_{mk\_i}(R_i, c_i, R_{i-1}, R_{i+1}, k_i, s_i, T_i, U_i, sid, c_1, k', T'_i, T', CT'_i)$ by using the MAC key $mk_i$ of the general communication devices $U_i$ based on the tag generation algorithm Tag for a message authentication code. The authentication tag generation unit 116 transmits $(c_1, k', T'_i, T', CT'_i, \sigma'_i)$ to the general communication devices $U_i$.

In step S416, in the case of $i \in [2, n+k]$, the authentication tag verification unit 216 of the general communication devices $U_i$ receives $(c_1, k', T'_i, T', CT'_i, \sigma'_i)$ from the key distribution device S and performs verification based on the verification algorithm Ver for a message authentication code. When the authentication tag $\sigma'_i$ is invalid, the authentication tag verification unit 216 ends the session of the general communication devices $U_i$. Further, the authentication tag verification unit 216 computes $K_1^1$ by an exclusive OR of $T'_i$ and $K_i^1$ with respect to $i=2, n, \ldots, n+k$ and computes $K_1^1$ by an exclusive OR of $T'_i$ and $g^r$ with respect to $i=3, \ldots, n-1$.

$$K_1^1 = T'_i \oplus K_i^1$$

$$K_1^1 = T'_i \oplus g^r$$

Further, the authentication tag verification unit 216 computes by an exclusive OR of T' and $K_1^1$.

$$k_1 \| s_1 = T' \oplus K_1^1$$

Then, the authentication tag verification unit 216 verifies whether or not $c_1 = g^{k\_1}h^{s\_1}$ is satisfied. When $c_1 = g^{k\_1}h^{s\_1}$ is not satisfied, the authentication tag verification unit 216 ends the session of the general communication devices $U_i$.

In the case of $i=1$, the authentication tag verification unit 216 of the representative communication device $U_1$ receives $(k', CT'_1, \sigma'_1)$ from the key distribution device S and performs verification based on the verification algorithm Ver for a message authentication code. When the authentication tag $\sigma'_1$ is invalid, the authentication tag verification unit 216 ends the session of the representative communication device $U_1$.

In step S417, the session key generation unit 217 of the communication devices $U_i$ decrypts the common key $K_1 \leftarrow FDec_{usk\_i}(CT'_i, P_i)$ by using the user secret key $usk_i$ of the communication devices $U_i$ based on the decryption algorithm FDec for functional encryption. Further, the session key generation unit 217 computes a common key $K_2$ based on the pseudo-random function F' as the following formula.

$$K_2 = F'(sid, k' \oplus k_1)$$

Then, the session key generation unit 217 computes a session key SK based on the pseudo-random function F''' as the following formula.

$$SK = F'''(sid, K_1) \oplus F'''(sid, K_2)$$

Last, the communication devices $U_i$ (1=1, ..., n) update secret information to be used for user addition. Further, the communication devices $U_i$ (i=n+1, ..., n+k) newly store the secret information in the storage 200. The representative communication devices $U_1$ update the secret information stored in the storage 200 with secret information $H_1^l$ and r computed by the following formulas.

$$H_1^l = R_{n+k}^{r1}$$

$$r = F''''(sid, K_1) \oplus F''''(sid, K_2)$$

The communication device $U_i$ (i=2, ..., n−1) updates the secret information stored in the storage 200 with secret information r computed by the following formula.

$$r = F''''(sid, K_1) \oplus F''''(sid, K_2)$$

The communication devices $U_n$ update the secret information stored in the storage 200 with secret information $H_n^r$ and r computed by the following formulas.

$$H_n^r = R_{n+1}^{rn}$$

$$r = F''''(sid, K_1) \oplus F''''(sid, K_2)$$

The communication device $U_i$ (i=n+1, ..., n+k) stores secret information $H_i^l$, $H_i^r$, and r computed by the following formulas in the storage 200.

$$H_i^l = R_{i-1}^{ri}$$

$$H_i^r = R_{i+1}^{ri}$$

$$r = F''''(sid, K_1) \oplus F''''(sid, K_2)$$

According to the key exchange technology of the present invention, if only user IDs are preliminarily registered as information of users who may perform key exchange, users can be dynamically added within the corresponding range, in the above-described configuration. Further, a plurality of users can efficiently share the common key also in the user addition. Specifically, the whole computational complexity required for the key exchange is the constant number of times which is the number of users, that is, O(1).

Application Example

The key exchange system according to the present embodiment is the system in which the session key SK is shared among the communication devices $U_i$ via the key distribution device S. In this case, though user IDs for identifying the communication devices $U_i$ (for example, mail addresses) need to be preliminarily registered in the key distribution device S, the session key SK can be shared in O(1) by using a star topology and therefore, time until the start of operations of various encryption communication systems can be shortened. Some application examples of this key exchange system will be shown below.

(1) To use for key distribution in a call between two points and a telephone conference employing the VoIP technology.
(2) To use for key distribution in encryption communication in a Web conference and a Web call using browser and smartphones, in place of datagram transport layer security (DTLS) in WebRTC.
(3) To use for sharing a decryption key for a messaging application.

Modification

It is obvious that the present invention is not limited to the above-described embodiment and alterations can be made as appropriate within a scope of the idea of the present invention. Various types of processing which are described in the above embodiment may be executed in time series in accordance with the described order and may be executed in parallel or individually in accordance with the processing capacity of the device performing the processing or in accordance with the need.

[Program and Recording Medium]

When various types of processing functions in the devices described in the above embodiment are implemented on a computer, the contents of processing function to be contained in each device is written by a program. With this program executed on the computer, various types of processing functions in the above-described devices are implemented on the computer.

This program in which the contents of processing are written can be recorded in a computer-readable recording medium. The computer-readable recording medium may be any medium such as a magnetic recording device, an optical disc, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be stored in a storage unit of a server computer and transferred from the server computer to other computers via a network so as to be distributed.

A computer which executes such program first stores the program recorded in a portable recording medium or transferred from a server computer once in a storage unit of the computer, for example. When the processing is performed, the computer reads out the program stored in the storage unit of the computer and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that a program according to the present embodiment includes information which is provided for processing performed by electronic calculation equipment and which is equivalent to a program (such as data which is not a direct instruction to the computer but has a property specifying the processing performed by the computer).

In the present embodiment, the present device is configured with a predetermined program executed on a computer. However, the present device may be configured with at least part of these processing contents realized in a hardware manner.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

DESCRIPTION OF REFERENCE NUMERALS 1 key distribution device
2 communication device
3 communication network
100 storage
101 first setup unit
102 second setup unit
103 user ID reception unit
104 initial key generation unit
105 secret string generation unit
111 user key transmission unit
113 session ID generation unit
114 authentication tag verification unit
115 third key generation unit
116 authentication tag generation unit
200 storage
203 user ID transmission unit
204 initial key reception unit
205 secret string generation unit
211 user key reception unit
212 first key generation unit
214 second key generation unit
215 authentication tag generation unit
216 authentication tag verification unit
217 session key generation unit

What is claimed is:

1. A key exchange method, in which n denotes an integer which is 2 or larger, i denotes each integer from 1 to n, j denotes each integer from 2 to n, S denotes a key distribution device, $U_i$ denotes n communication devices, $U_1$ denotes one piece of representative communication device which is selected from the communication devices $U_i$, $U_j$ denotes n−1 general communication devices obtained by excluding the representative communication device $U_1$ from the communication devices $U_i$, $\|$ denotes a concatenation operator, and $\alpha$ and $\beta$ are defined by following formulas, $$\alpha = \begin{cases} i-1 & \text{if } i-1 \geq 1 \\ i-1+n & \text{if } i-1 < 1 \end{cases},$$

$$\beta = \begin{cases} i+1 & \text{if } i+1 \leq n \\ i+1-n & \text{if } i+1 > n \end{cases}$$

secret strings $st_s$ and $st'_s$ are stored in a storage of the key distribution device S, and
secret strings $st_i$ and $st'_i$ are stored in a storage of the communication devices $U_i$, the key exchange method comprising:
a first key generation step in which the communication devices $U_i$ generate $r_i$, $k_i$, and $s_i$ by using the secret strings $st_i$ and $st'_i$ based on a twisted pseudo-random function, compute $R_i = g^{r_i}$ and $c_i = g^{k_i} h^{s_i}$, wherein each of g and h denotes a generator of a multiplicative cyclic group G of a prime number order p of k bits, and transmit ($R_i$, $c_i$) to the key distribution device S;
a session ID generation step in which the key distribution device S generates sid by using $c_1, \ldots, c_n$ based on a target-collision resistant hash function and transmits, to the communication devices $U_i$, (sid, $R_\alpha$, $R_\beta$) with respect to each i;
a representative second key generation step in which the representative communication device $U_1$ generates $K_1^1$ by using (sid, $R_n^{r-1}$) based on a pseudo-random function, generates $K_1^r$ by using (sid, $R_2^{r-1}$) based on the pseudo-random function, computes $T_1$ by an exclusive OR of $K_1^1$ and $K_1^r$, computes T' by an exclusive OR of $K_1^1$ and $k_1\|s_1$, and transmits ($T_1$, T') to the key distribution device S;
a general second key generation step in which the general communication devices $U_j$ generate $K_j^1$ by using (sid, $R_\alpha^{r-j}$) based on the pseudo-random function, generate $K_j^r$ by using (sid, $R_\beta^{r-j}$) based on the pseudo-random function, compute $T_j$ by an exclusive OR of $K_j^1$ and $K_j^r$, and transmit ($k_j$, $s_j$, $T_j$) to the key distribution device S;
a third key generation step in which the key distribution device S generates $k_s$ by using the secret strings $st_s$ and $st'_s$ based on the twisted pseudo-random function, computes k' by an exclusive OR of $k_2, \ldots, k_n$, $k_s$, computes $T'_j$ by an exclusive OR of $T_1, \ldots, T_{j-1}$ with respect to each j, transmits k' to the representative communication device $U_1$, and transmits (k', $T'_j$, T') to the general communication devices $U_j$;
a first session key generation step in which the general communication devices $U_j$ compute $K_1^1$ by an exclusive OR of $T'_j$ and $K_j^1$ and compute $k_1\|s_1$ by an exclusive OR of T' and $K_1^1$;
a second session key generation step in which the communication devices $U_i$ generate a common key $K_2$ by using sid and an exclusive OR of k' and $k_1$ based on the pseudo-random function.

2. The key exchange method according to claim 1, in which
time denotes current time, ID denotes a predicate variable representing the communication device, and TF denotes a predicate variable representing a time frame of the communication device,
a master secret key msk for functional encryption is further stored in the storage of the key distribution device S, and
an initial key $sk_{U_i}$ which is generated from an identifier $U_i$ of the communication devices $U_i$ by using the master secret key msk' based on a key derivation algorithm for ID-base encryption is further stored in the storage of the communication devices $U_1$, the key exchange method further comprising:
a user key transmission step in which the key distribution device S generates a user secret key $usk_i$ by using the master secret key msk with respect to each i with attribution used as $A_i = (U_i, \text{time})$ based on a key derivation algorithm for functional encryption, and encrypts the user secret key $usk_i$ by using the identifier $U_i$ based on an encryption algorithm for ID-base encryption so as to generate a cipher text $CT_i$; and
a user key reception step in which the communication devices $U_i$ decrypt the cipher text $CT_i$ by using the initial key $sk_{U\_i}$ based on a decryption algorithm for ID-base encryption so as to obtain the user secret key $usk_i$, wherein in the third key generation step, a common key $K_1$ is generated by using the secret strings $st_s$ and $st'_s$ based on the twisted pseudo-random function, and the common key $K_1$ is encrypted with respect to each i with an access structure $P_i=(ID=U_i)\wedge(timee\in TF)$ based on an encryption algorithm for functional encryption so as to generate a cipher text $CT_i$, and in the second session key generation step, the cipher text $CT_i$ is decrypted by using the user secret key $usk_i$ based on a decryption algorithm for functional encryption so as to obtain the common key $K_1$ and a session key SK is computed by an exclusive OR of a value generated by using $(sid, K_1)$ based on the pseudo-random function and a value generated by using $(sid, K_2)$ based on the pseudo-random function.

3. The key exchange method according to claim 2, in which in the user key transmission step, a MAC key $mk_i$ is generated based on a key generation algorithm for a message authentication code and the user secret key $usk_i$ and the MAC key $mk_i$ are encrypted by using the identifier $U_i$ based on the encryption algorithm for ID-base encryption so as to generate the cipher text $CT_i$, and in the user key reception step, the cipher text $CT_i$ is decrypted by using the initial key $sk_{U\_i}$ based on the decryption algorithm for ID-base encryption so as to obtain the user secret key $usk_i$ and the MAC key $mk_i$, the key exchange method further comprising:

a representative first authentication tag generation step in which the representative communication device $U_j$ generates an authentication tag $\sigma_j$ by using the MAC key $mk_1$ and $R_1$, $c_1$, $R_n$, $R_2$, $T_1$, T', $U_1$, and sid based on a tag generation algorithm for a message authentication code;

a general first authentication tag generation step in which the general communication devices $U_j$ generate an authentication tag $\sigma_j$ by using the MAC key $mk_j$ and $R_j$, $c_j$, $R_\alpha$, $R_\beta$, $k_j$, $s_j$, $T_j$, $U_j$, and sid based on the tag generation algorithm for a message authentication code;

a first authentication tag verification step in which the key distribution device S verifies the authentication tag $\sigma_1$ by using the MAC key $mk_1$ and $R_1$, $c_1$, $R_n$, $R_2$, $T_1$, T', $U_1$, and sid based on a verification algorithm for a message authentication code, and verifies the authentication tag $\sigma_j$ by using the MAC key $mk_j$ and $R_j$, $c_j$, $R_\alpha$, $R_\beta$, $k_j$, $s_j$, $T_j$, $U_j$, and sid based on the verification algorithm for a message authentication code so as to verify whether or not $c_j=g^{k\_j}h^{s\_j}$ is satisfied with respect to each j;

a second authentication tag generation step in which the key distribution device S generates an authentication tag $\sigma'_1$ by using the MAC key $mk_1$ and $R_1$, $c_1$, $R_n$, $R_2$, $T_1$, T', $U_1$, sid, k', and $CT'_1$ based on the tag generation algorithm for a message authentication code, and generates an authentication tag $\sigma'_j$ with respect to each j by using the MAC key $mk_j$ and $R_j$, $c_j$, $R_\alpha$, $R_\beta$, $k_j$, $s_j$, $T_j$, $U_j$, sid, $c_1$, k', $T'_j$, T', and $CT'_j$ based on the tag generation algorithm for a message authentication code;

a representative second authentication tag verification step in which the representative communication device $U_1$ verifies the authentication tag $\sigma'_1$ by using the MAC key $mk_1$ and $R_1$, $c_1$, $R_n$, $R_2$, $T_1$, T', $U_1$, sid, k', and $CT'_1$ based on the verification algorithm for a message authentication code; and a general second authentication tag verification step in which the general communication devices $U_j$ verify the authentication tag $\sigma'_j$ by using the MAC key $mk_j$ and $R_j$, $c_j$, $R_\alpha$, $R_\beta$, $k_j$, $s_j$, $T_j$, $U_j$, sid, $c_1$, k', $T'_j$, T', and $CT'_j$ based on the verification algorithm for a message authentication code, compute $K_1^1$ by the exclusive OR of $T'_j$ and $K_j^1$, and compute $k_1\|s_1$ by the exclusive OR of T' and $K_1^1$ so as to verify whether or not $c_1=g^{k\_1}h^{s\_1}$ is satisfied.

4. A key exchange system in which n denotes an integer which is 2 or larger, i denotes each integer from 1 to n, j denotes each integer from 2 to n, $\|$ denotes a concatenation operator, and $\alpha$ and $\beta$ are defined by following formulas, $$\alpha = \begin{cases} i-1 & \text{if } i-1 \geq 1 \\ i-1+n & \text{if } i-1 < 1 \end{cases},$$

$$\beta = \begin{cases} i+1 & \text{if } i+1 \leq n \\ i+1-n & \text{if } i+1 > n \end{cases}$$

the key exchange system comprising:
a key distribution device S; and
n communication devices $U_i$ that include a representative communication device $U_1$ and n-1 general communication devices $U_j$, wherein the key distribution device S includes
a memory which stores secret strings $st_s$ and $st'_s$, and
processing circuitry configured to
receive $(R_i, c_i)$ from the communication devices $U_i$ with respect to each i, generate sid by using $c_1, \ldots, c_n$ based on a target-collision resistant hash function, and transmit, to the communication devices $U_i$, (sid, $R_\alpha$, $R_\beta$) with respect to each i, and
receive $(T_1, T')$ from the representative communication device $U_1$, receive $(k_j, s_j, T_j)$ from the general communication device $U_j$ with respect to each j, generate $k_s$ by using the secret strings $st_s$ and $st'_s$ based on a twisted pseudo-random function, compute k' by an exclusive OR of $k_2, \ldots, k_n, k_s$, compute $T'_j$ by an exclusive OR of $T_1, \ldots, T_{j-1}$ with respect to each j, transmit k' to the representative communication device $U_1$, and transmit (k', $T'_j$, T') to the general communication devices $U_j$, the representative communication device $U_1$ includes
a memory which stores secret strings $st_1$ and $st'_1$, and
processing circuitry configured to
generate $r_1$, $k_1$, and $s_1$ by using the secret strings $st_1$ and $st'_1$ based on the twisted pseudo-random function, compute $R_1=g^{r\_1}$ and $C_1=g^{k\_1}h^{s\_1}$, wherein each of g and h denotes a generator of a multiplicative cyclic group G of a prime number order p of k bits, and transmit $(R_1, c_1)$ to the key distribution device S,
receive (sid, $R_n$, $R_2$) from the key distribution device S, generate $K_1^1$ by using (sid, $R_n^{r\_1}$) based on the pseudo-random function, generate $K_1^r$ by using (sid, $R_2^{r\_1}$) based on the pseudo-random function, compute $T_1$ by an exclusive OR of $K_1^1$ and $K_1^r$, compute T' by an exclusive OR of $K_1^1$ and $k_1^1$ $k_1\|s_1$, and transmit $(T_1, T')$ to the key distribution device S, and
receive k' from the key distribution device S and generate a common key $K_2$ by using sid and an exclusive OR of k' and $k_1$ based on the pseudo-random function, and the general communication devices $U_j$ include
  a memory which stores secret strings $st_j$ and $st'_j$, and
    processing circuitry configured to
      generate $r_j$, $k_j$, and $s_j$ by using the secret strings $st_j$ and $st'_j$ based on the twisted pseudo-random function, compute $R_j=g^{r_j}$ and $c_j=g^{k_j}h^{s_j}$, and transmit $(R_j, c_j)$ to the key distribution device S,
      receive (sid, $R_\alpha$, $R_\beta$) from the key distribution device S, generate $K_j^1$ by using (sid, $R_\alpha^{r_j}$) based on the pseudo-random function, generate $K_j^r$ by using (sid, $R_\beta^{r_j}$) based on the pseudo-random function, compute $T_j$ by an exclusive OR of $K_j^1$ and $K_j^r$, and transmit $(k_j, s_s, T_j)$ to the key distribution device S, and
      receive (k', $T'_j$, T') from the key distribution device S, compute $K_1^1$ by the exclusive OR of $T_j$ and $K_j^1$, compute $k_1 \| s_1$ by the exclusive OR of $T'$ and $K_1^1$, and generate the common key $K_2$ by using sid and the exclusive OR of k' and $k_1$ based on the pseudo-random function.

* * * * *